United States Patent
Blanding et al.

(10) Patent No.: US 7,609,467 B2
(45) Date of Patent: Oct. 27, 2009

(54) MONOLITHIC OPTICAL MOUNT

(75) Inventors: Douglass L Blanding, Painted Post, NY (US); John H Bruning, Pittsford, NY (US)

(73) Assignee: Corning Incorporated, Corning, NY (US)

(*) Notice: Subject to any disclaimer, the term of this patent is extended or adjusted under 35 U.S.C. 154(b) by 35 days.

(21) Appl. No.: 12/072,631

(22) Filed: Feb. 27, 2008

(65) Prior Publication Data
US 2008/0204907 A1 Aug. 28, 2008

Related U.S. Application Data

(60) Provisional application No. 60/904,033, filed on Feb. 28, 2007.

(51) Int. Cl.
*G02B 7/02* (2006.01)
(52) U.S. Cl. .................. 359/823; 359/819; 359/811
(58) Field of Classification Search ......... 359/810–814, 359/819–824
See application file for complete search history.

(56) References Cited

U.S. PATENT DOCUMENTS

| | | | |
|---|---|---|---|
| 5,270,870 A | 12/1993 | O'Brien et al. | 359/820 |
| 5,353,167 A | 10/1994 | Kuklo et al. | 359/876 |
| 5,428,482 A * | 6/1995 | Bruning et al. | 359/827 |
| 6,538,829 B2 * | 3/2003 | Rau et al. | 359/819 |
| 6,873,478 B2 | 3/2005 | Watson | 359/819 |
| 6,906,848 B2 | 6/2005 | Aubuchon | 359/291 |
| 2006/0001886 A1 | 1/2006 | Zacharie et al. | 356/486 |

FOREIGN PATENT DOCUMENTS

KR 10-2005-0074926 7/2005

OTHER PUBLICATIONS

Douglass L. Blanding "Exact Constraint: Machine Design Using Kinematic Principles"; ASME Press, New York, 1999 pp. 97-98.

* cited by examiner

*Primary Examiner*—Mohammed Hasan
(74) *Attorney, Agent, or Firm*—Timothy M. Schaeberle (57) ABSTRACT

A monolithic optical element mount has an inner member suspended within an outer member and movable with respect to the outer member along an axis. A first set of fold flexures extends from the inner member to the outer member, so that each fold flexure in the first set has a fold that lies on a tangent to a first circle lying in a first plane that is orthogonal to the axis. A second set of fold flexures extends from the inner member to the outer member, so that each fold flexure in the second set has a fold that lies on a tangent to a second circle lying in a second plane that is parallel to the first plane. With respect to a view taken along the axis, the folds for the first set do not align with the folds for the second set.

20 Claims, 13 Drawing Sheets

MONOLITHIC OPTICAL MOUNT

CROSS REFERENCE TO RELATED APPLICATIONS

This application claims the benefit of U.S. Provisional Application Ser. No. 60/904,033 filed Feb. 28, 2007, entitled "Monolithic Optical Mount" by Blanding et al.

FIELD

This invention generally relates to component mounting and more particularly relates to a mount for an optical element that allows movement along an optical axis, but constrains rotational movement along any axis and constrains translational movement in directions orthogonal to the optical axis.

BACKGROUND

Photolithography or microlithography apparatus are widely used in the fabrication of microelectronic semiconductor devices and other microdevices. In photolithography, an optical system directs light energy to record a pattern at high resolution and with precise registration onto a photosensitive layer formed on a silicon wafer or other substrate. Continuing improvements in miniaturization place increasingly more challenging demands on the performance and accuracy of the optical system used for this function. Microlithography optical systems are fairly large and complex, containing a number of optical elements.

Achieving correct magnification and focus are critical for obtaining precise layer-to-layer registration and submicron resolution with photolithographic optics used for device fabrication. For example, in order to properly adjust magnification or focus, it is often necessary to move specific components of the optical system to specific positions along the optical axis. In obtaining this movement, it is important to minimize or eliminate inadvertent movement of other components of the optical system. For example, focus adjustment is usually enabled by displacement of an optical element along the optical axis, conventionally the z-axis, with no translation in the orthogonal x or y axes.

In conventional camera optics, focusing is often accomplished using a threaded mount mechanism. However, even with precision machining, it is extremely difficult to achieve, with threaded fittings, the level of positional accuracy needed to prevent unintended shifting of components perpendicular to the optical axis. As a general rule, passive mechanical fittings or sliding components of this type can tend to exhibit additive and non-repeatable tolerance errors. The relative size and complexity of photolithography optics further compound this problem. Because of this, threaded fittings are generally not well-suited for providing focus adjustment with high-precision semiconductor microlithography optics. Instead, a stacked annuli lens assembly arrangement is preferred for this type of optical apparatus, as described, for example, in U.S. Pat. No. 5,428,482 entitled "Decoupled Mount for Optical Element and Stacked Annuli Assembly" to Bruning et al.

Where lens axial adjustment may be necessary in a stacked annuli arrangement, solutions that take advantage of balanced or kinematic constraining forces, using springs and flexures for example, can be more promising for high precision adjustment applications than are static solutions. However, proposed solutions of this type for providing pure axial translation adjustment are typically highly complex, often requiring precision fabrication and assembly of multiple interconnecting parts. As just one example, in the embodiment described in U.S. Pat. No. 6,538,829 entitled "Optical Element Mount Comprising an Optical Element Holding Frame" to Rau et al., an optical mount for adjusting two components relative to each other is shown. The mechanism described in the '829 Rau et al. disclosure employs a fairly complex network of flexures and hinges for providing this type of axial translation adjustment.

Radial flexures have been used for accurate axial positioning in optical applications. For example, U.S. Patent Application Publication 2006/0001886 entitled "Precision Retroreflector Positioning Apparatus" by Zacharie et al. describes retroreflector mounting for an interferometer using an arrangement with radial flexures to provide minimal axial deviation for this device. While this type of approach has inherent mechanical advantages, the part count when using this type of solution is sizable and problems with additive tolerances can occur.

It is known in the field of optical design and precision mechanics that flexures can be used to connect two bodies in order to define certain patterns of constraints, thereby allowing certain desired degrees of freedom (DOF) between the two bodies, while suppressing or inhibiting others. One pattern that allows a single DOF of straight-line motion is an arrangement of two sets of three constraints, where the constraints of each set are coplanar, and the planes defined by each set are parallel and are separated from each other by some distance. Such a pattern of constraints results in a single degree of freedom of translational motion along a line that is perpendicular to the planes of the constraints. It is also well known that in order to achieve purity of motion, the three constraints of each set should be arranged in a trilaterally symmetric pattern; each constraint tangent to a circle. The line joining the centers of the two circles defined by these constraints should be perpendicular to the two planes.

Figure 1A:
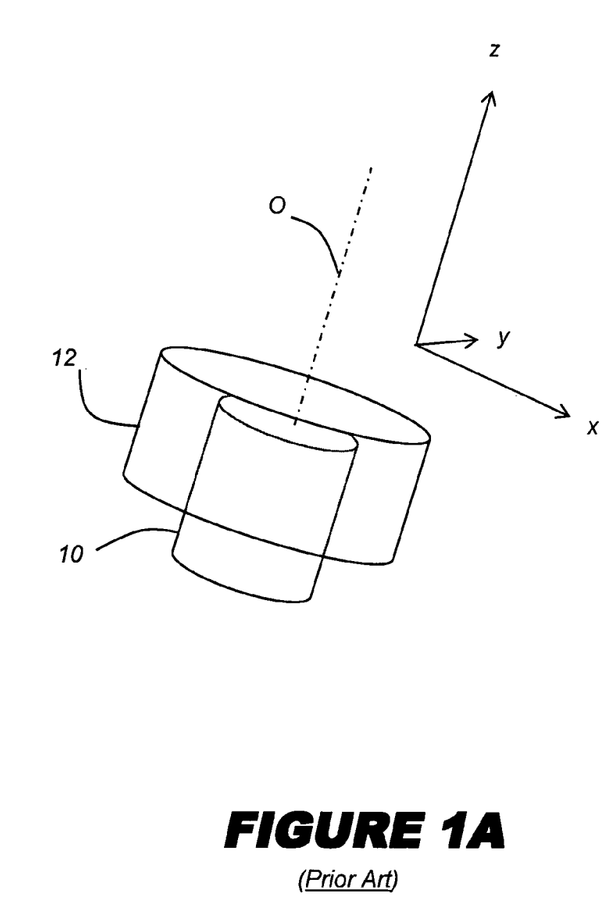
FIG. 1A is a perspective view showing the overall function of an ideal lens mount relative to standard coordinate axes.

Referring to FIG. 1A, there is shown an inner member, lens holder 10, in a frame 12, with reference xyz axes designations. The z axis corresponds to the optical axis O. For this application, only movement parallel to the z-axis is desirable. Translation in the x-y plane or rotation about x or y axes (θx, θy rotation) must be prevented. For spherical optics, rotation about the z axis would, in general, not be objectionable; however, there must be no rotation about the x or y axes. The mount mechanism that connects lens holder 10 to frame 12 must allow translational motion only in the direction of optical axis O, that is, the z-direction.

Figure 1B:
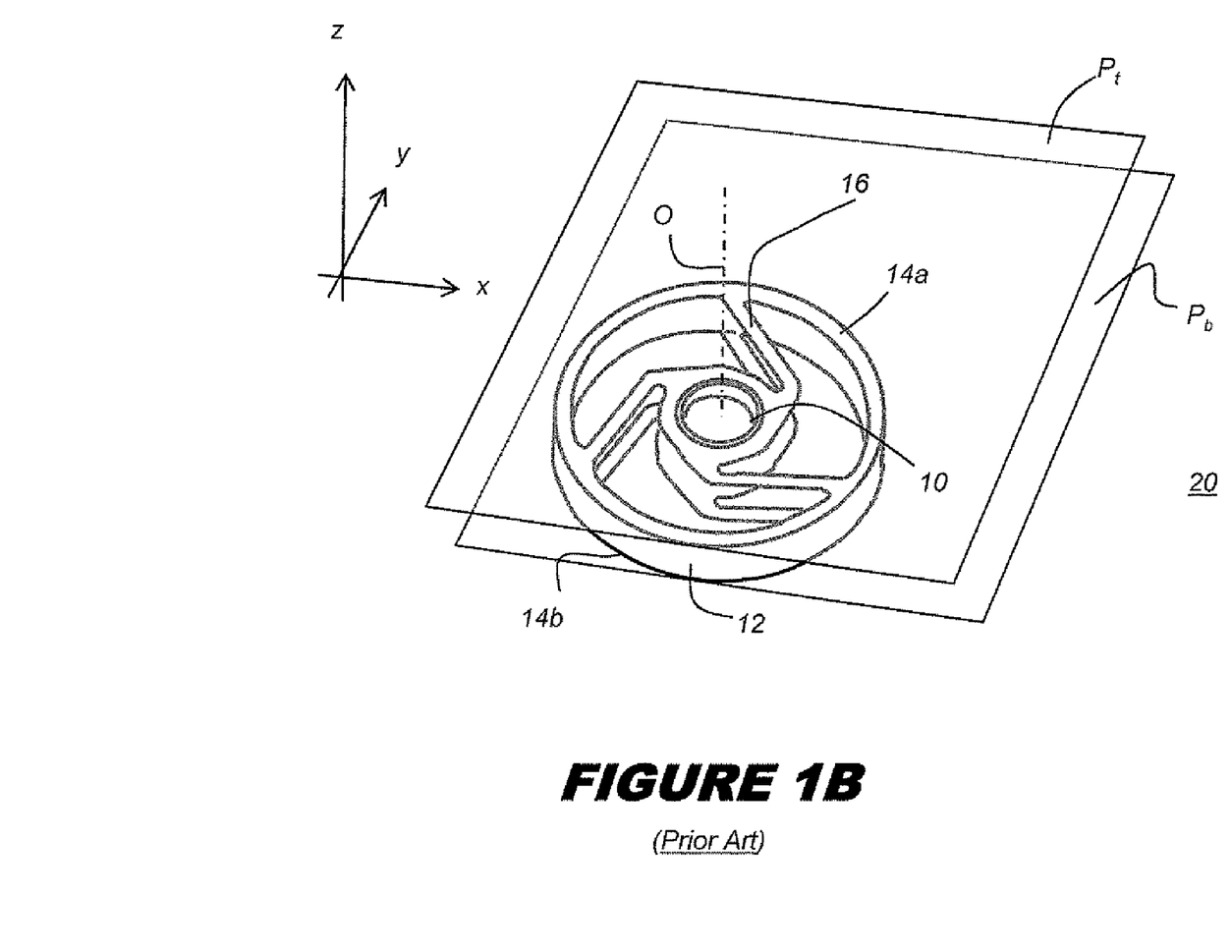
FIG. 1B is a perspective view of a lens mount providing axial translation using sheet flexures.

Flexures have been used to provide the needed mechanical constraint in lens applications. For example, FIG. 1B shows a lens mount 20 that provides this single degree of freedom, z-axis translation along optical axis O. Lens holder 10 is suspended from frame 12 by means of two parallel sheet flexures 14a and 14b. Parallel sheet flexures 14a and 14b lie in two parallel planes, $P_t$ and $P_b$. Sheet flexure 14a lies in top plane $P_t$. Bottom sheet flexure 14b lies in bottom plane $P_b$. Each sheet flexure 14a, 14b has spokes 16 that extend from frame 12 to lens holder 10 and provide a linear constraint. The combination of these symmetric spokes 16 with sheet flexures in the parallel planes provided allows a single translational degree of freedom, along optical axis O.

Figure 1C:
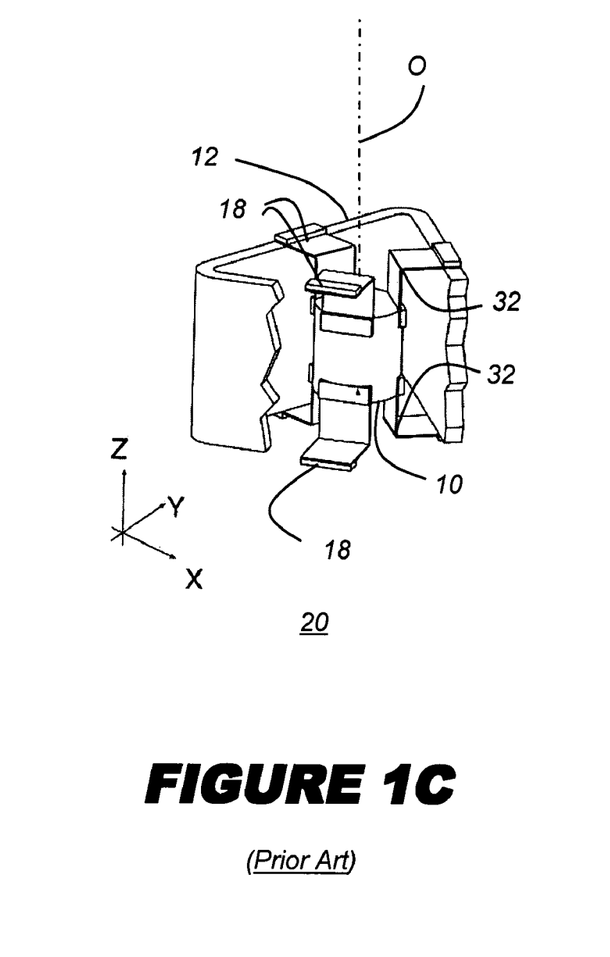
FIG. 1C is a perspective view of a lens mount providing axial translation using pairs of fold flexures.

FIG. 1C shows an alternative configuration of lens mount 20 that applies the same constraint pattern shown in FIG. 1B but employs folded sheet flexures, termed fold flexures 18 in the context of this application. Again, lens holder 10 is suspended from frame 12 by three pairs of fold flexures 18. Each fold flexure 18 provides a single constraint along its fold 32. In the context of this application, a reference to a fold can be considered with respect to the inner fold that is formed at the juncture of inner surfaces of the flexure.

Figure 1D:
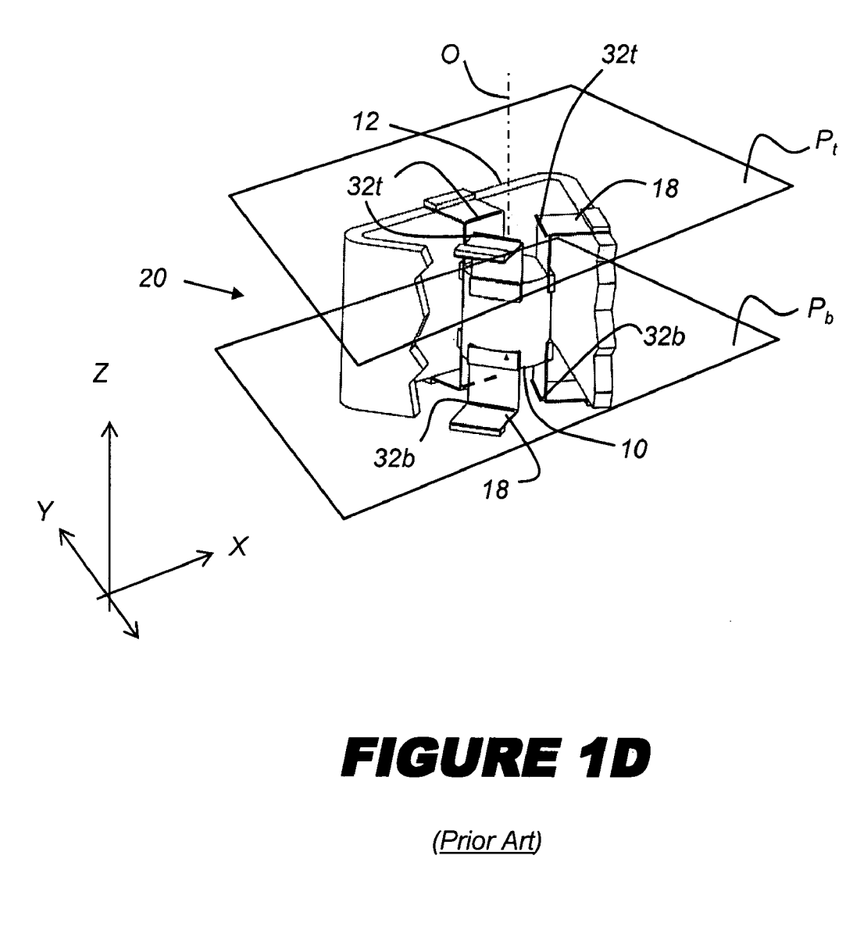
FIG. 1D is a perspective view showing parallel planes that include top and bottom folds.

As is shown in FIG. 1D, the set of top inner folds 32t lie in top plane $P_t$; the set of bottom inner folds 32b lie in bottom plane $P_b$, again with planes $P_t$ and $P_b$ parallel to one another. This relationship is important for allowing translation only along the optical axis O. Kinematically considered, if planes $P_t$ and $P_b$ were not parallel, there would be some freedom of movement relative to the x-y axes.

Figure 1E:
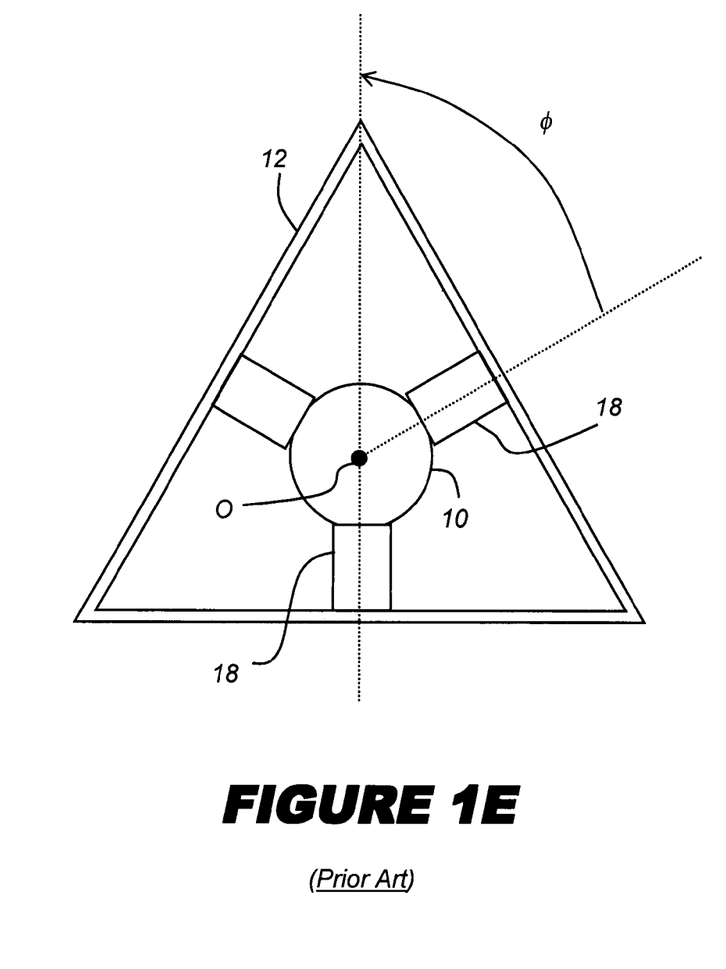
FIG. 1E is a view of the lens mount of FIG. 1C taken along the optical axis.

Using conventional designs, top and bottom fold flexures 18 are paired in such a way that they are radially aligned or overlapping with respect to a view taken along optical axis O. That is, as shown in FIG. 1E, with respect to a view taken along optical axis O, top and bottom fold flexures 18 both extend radially outward from axis O at the same angles. In the particular example of FIG. 1E, the pair of top and bottom fold flexures 18 shown at the phantom line are radially aligned or overlapping, both at angle φ with respect to a common reference. Their respective folds lie along parallel lines and may be overlapping or aligned, so that there are pairs of overlapping folds with respect to this view.

While the arrangement of fold flexures 18 shown in FIG. 1C has advantages for control of lens motion, however, there are still problems that prevent its use for high-precision photolithography applications. Even the slightest parasitic effects or asymmetries of construction can compromise the purity of motion demanded for lens adjustment in high-resolution photolithography. Materials used for fold flexures 18 and their fasteners must be carefully specified to minimize thermal effects due to differences in coefficients of thermal expansion. Precision machining and assembly techniques are required for attaching fold flexures 18 to both lens holder 10 and frame 12. In light of these problems, plus considering the additive tolerance errors inherent to conventional fabrication and assembly techniques, the solution of FIG. 1C has proved impractical for high-precision photolithography applications.

Overall, conventional lens mounting methods are likely to cause overconstraint and other problems that limit their usefulness for photolithography applications. While various solutions for axial positioning have been proposed, there remains a need for an optical assembly mount that allows adjustment of optical components along the optical axis, but inhibits movement along or about axes other than the optical axis, uses a minimum number of parts, and provides the level of performance necessary for use with optical assemblies for microlithography and other precision optical and positioning applications.

SUMMARY

It is an object of the present invention to advance the art of lens mounting and adjustment. With this object in mind, the present invention provides a monolithic optical element mount comprising:

an inner member suspended within an outer member and movable with respect to the outer member along an axis;

a first set of fold flexures extending from the inner member to the outer member, wherein each fold flexure in the first set has a fold that lies in a first plane that is orthogonal to the axis;

a second set of fold flexures extending from the inner member to the outer member, wherein each fold flexure in the second set has a fold that lies in a second plane that is parallel to the first plane;

and wherein, with respect to a view taken along the axis, the folds for the first set do not align with the folds for the second set.

It is a feature of the present invention that it provides a monolithically constituted optical mount using fold flexures.

It is an advantage of the present invention that it provides an optical mount apparatus that constrains translational motion so that it is permitted only along the optical axis.

DETAILED DESCRIPTION

In the context of the present disclosure, terms "top" and "bottom" are relative and do not indicate any necessary orientation of a surface, but are used simply to refer to and distinguish opposite surfaces for a component or block of material.

Figures shown and described herein are provided in order to illustrate key principles of operation and fabrication for lens mount devices according to the present invention and are not drawn with intent to show actual size or scale. Some exaggeration may be necessary in order to emphasize basic structural relationships or principles of operation.

The apparatus and method of the present invention provide a kinematic mount mechanism for a lens or other optical element that is advantaged over conventional lens mount designs by being monolithically constituted, either formed subtractively by forming an arrangement of cavities in a single block of material or formed additively by any of a number of techniques that deposit material in a pattern to form a single part. This single-part assembly provides an arrangement of flexures that suspend an inner member or lens holder from an outer member or frame. Single-part construction has advantages for eliminating problems such as those caused by thermal coefficient differences and fastener fabrication and assembly. Overall, a single-part machined lens mount assembly would have reduced mechanical stress over other types of lens mounts. A single part allows simpler handling, assembly, and mounting for constructing an optical assembly. A monolithically formed optical mount has built-in alignment.

A folded sheet flexure, more simply termed a fold flexure in the present application, provides a single constraint along the line of its fold. The present invention employs an arrangement of fold flexure constraints, having their folds oriented in such a way that it allows translational motion along an optical axis and constrains unwanted translation and rotation along axes orthogonal to the optical axis.

Figure 2A:
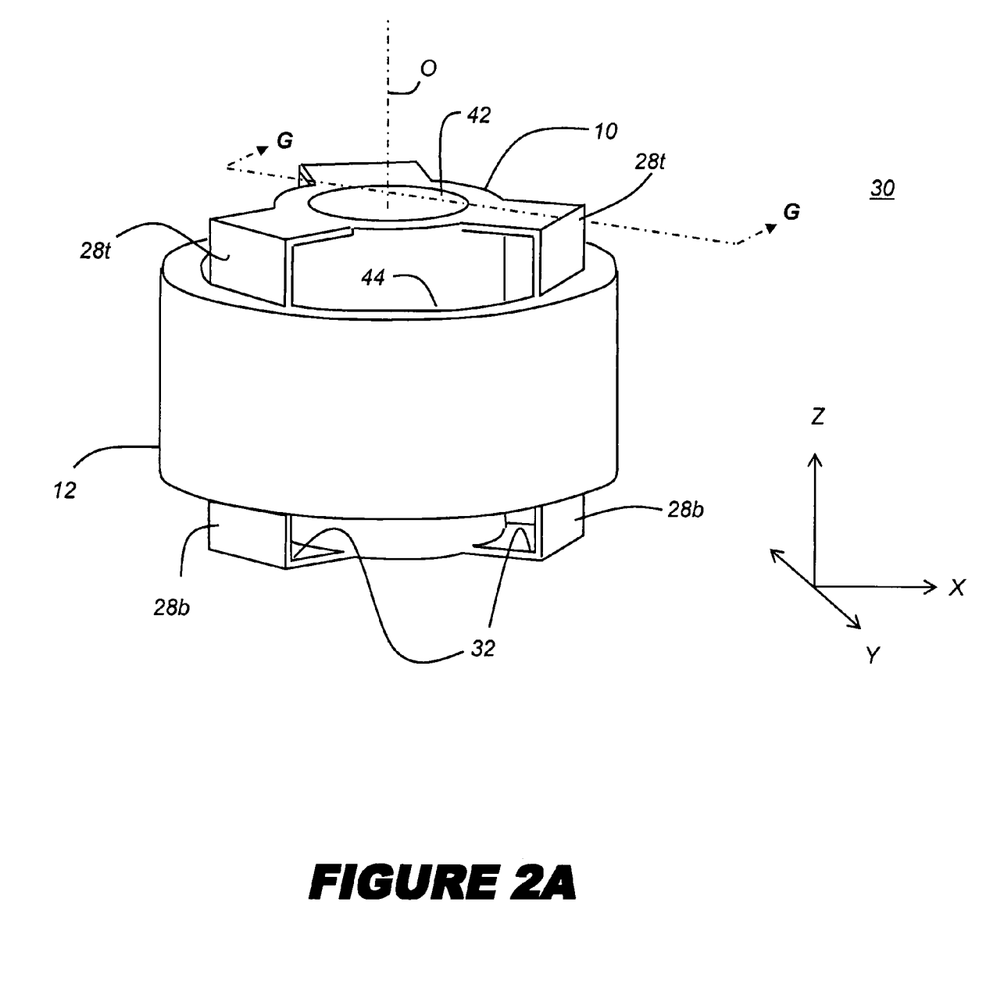
FIG. 2A is a perspective view of a monolithic optical mount in one embodiment.

FIG. 2A shows one embodiment of a lens mount 30 having single-part or monolithic construction. Lens holder 10 is suspended from frame 12 by top and bottom fold flexures 28t and 28b all formed from the same material, extended in the radial pattern shown in FIGS. 1C, 1D and 1E. A lens, mirror, prism, film, or other optical element 42 is seated within or on lens holder 10.

Figure 2B:
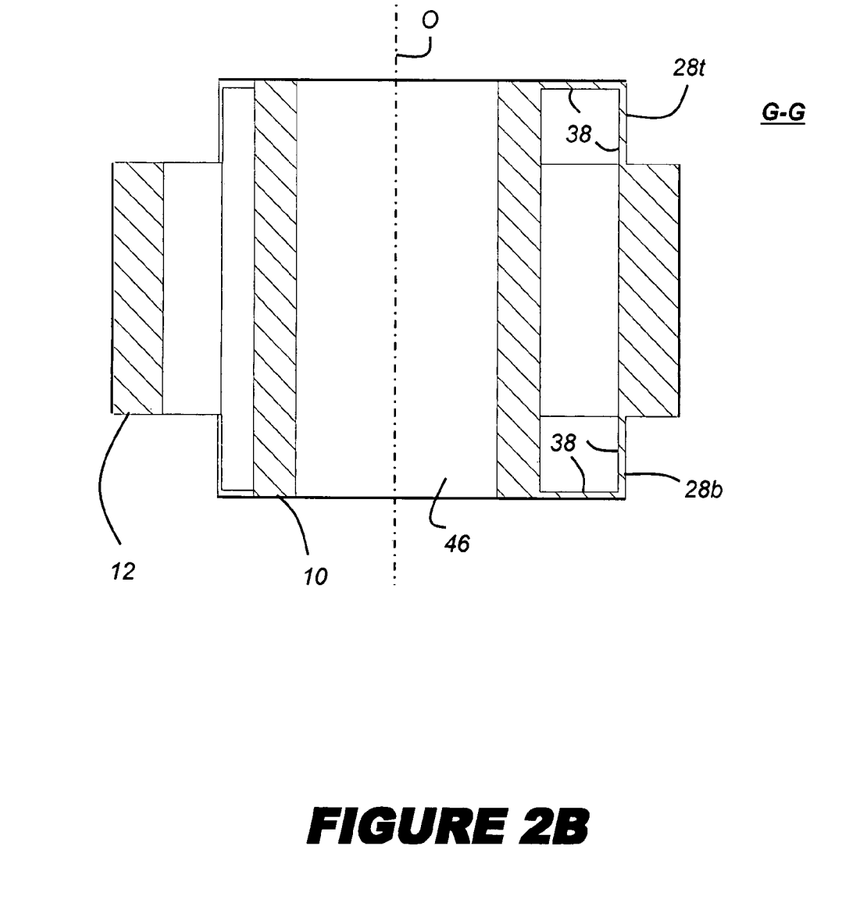
FIG. 2B is a cross-section view of the optical mount shown in FIG. 2A.

Because it uses the pattern of top and bottom fold flexures lying in two parallel planes, as shown in FIG. 1D, the embodiment of FIG. 2A provides a workable lens mount arrangement, allowing the single degree of freedom desired: z-axis translation. However, it can be appreciated that the task of machining lens mount 30 from a single block of material, using the configuration shown in FIG. 2A and its cross-sectional view shown in FIG. 2B, could prove challenging. Top and bottom fold flexures 28t and 28b are radially aligned, that is, extend radially outward from the axis O at the same angles. With respect to a view taken along optical axis O, the top and bottom fold structures are also aligned. While some combination of plunge and wire EDM techniques may be capable of making the necessary cuts to form each pair of radially aligned top and bottom fold flexures 28t and 28b working from top and bottom surfaces, the machining task that is required can be fairly complex. Moreover, with the aligned arrangement of fold flexures 28t and 28b shown in FIGS. 2A and 2B, lens mount 30 could not be fabricated using some other types of erosive machining methods. Conventional techniques would be unable to remove material that lies between each pair of aligned top and bottom fold flexures 28t and 28b to form inner surfaces 38 as shown to the right of lens holder 10 in the cross section view of FIG. 2B. Molding would also be difficult for the same reasons.

To alleviate this inherent difficulty in fabricating lens mount 30 as shown in FIG. 2A, the present invention provides embodiments having a more advantageous arrangement of radially extended fold flexures 28t and 28b that can be fabricated using plunge cuts and other erosive techniques that most easily remove material when working in directions that are predominantly parallel to the z-axis (axis O). In response to the need for a design of a lens mount that can be more easily machined, the embodiment of FIGS. 3A-3D provide an optical element mount 40 having a top surface 34 and a bottom surface 36 and using a rearrangement of radially extended fold flexure elements as defined by a cavity 44. In this configuration, top fold flexures 28t that suspend the inner member, lens holder 10, to frame 12 along the top of optical element mount 40 are not radially aligned, with respect to the optical axis, with bottom fold flexures 28b that extend between lens holder 10 and frame 12 toward the bottom of optical element mount 40. Thus, the folds for top and bottom fold flexures 28t and 28b are not aligned. As the sectioned view of FIG. 3B and the cross-section view of FIG. 3C show, access from top and bottom surfaces 34 and 36 for forming the respective fold flexures 28t and 28b is not obstructed with this arrangement, allowing more straightforward machining or other erosive fabrication techniques and simplifying any type of molding operation that might be used.

Figure 3A:
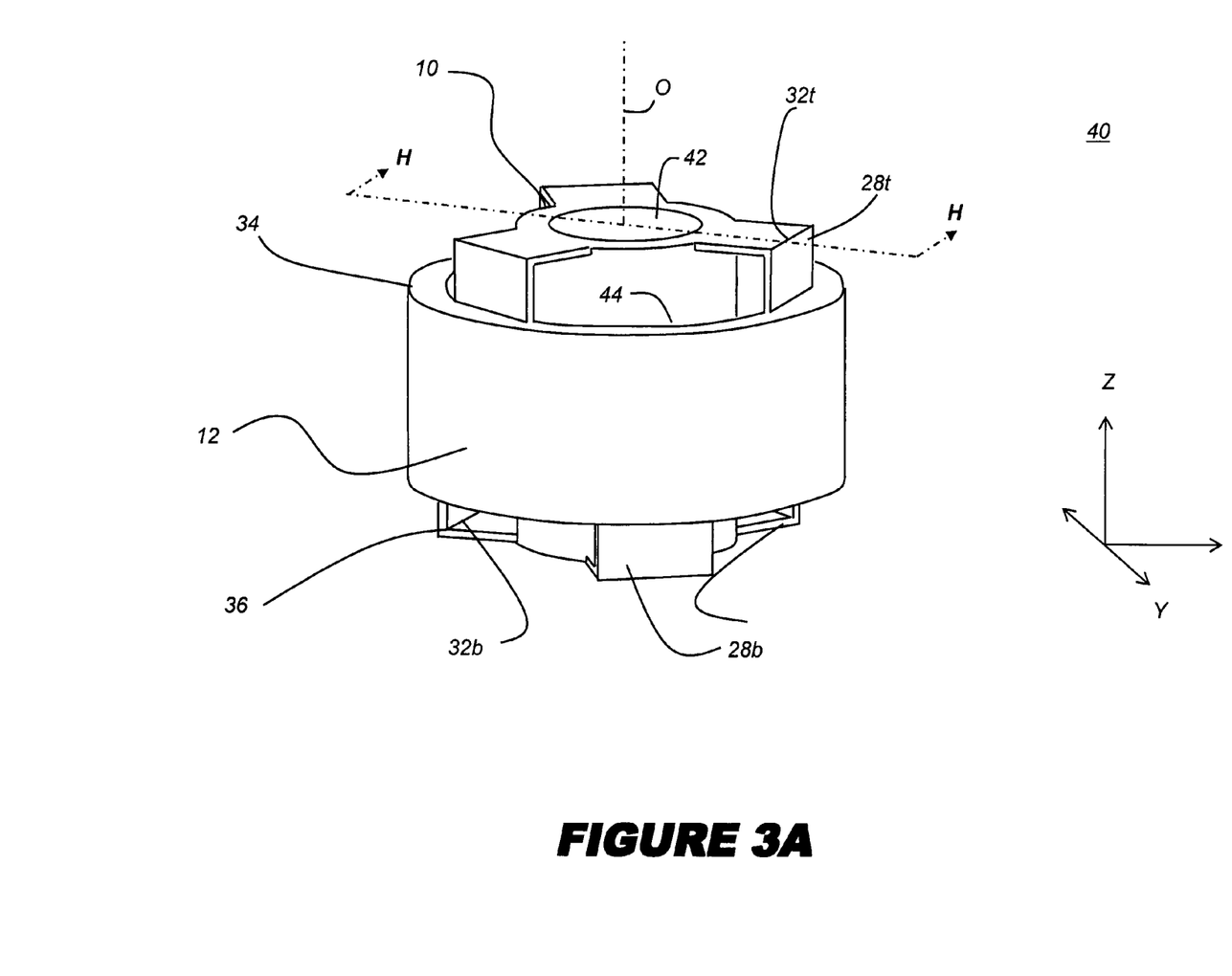
FIG. 3A is a perspective view of a monolithic optical mount in an alternate embodiment.
Figure 3B:
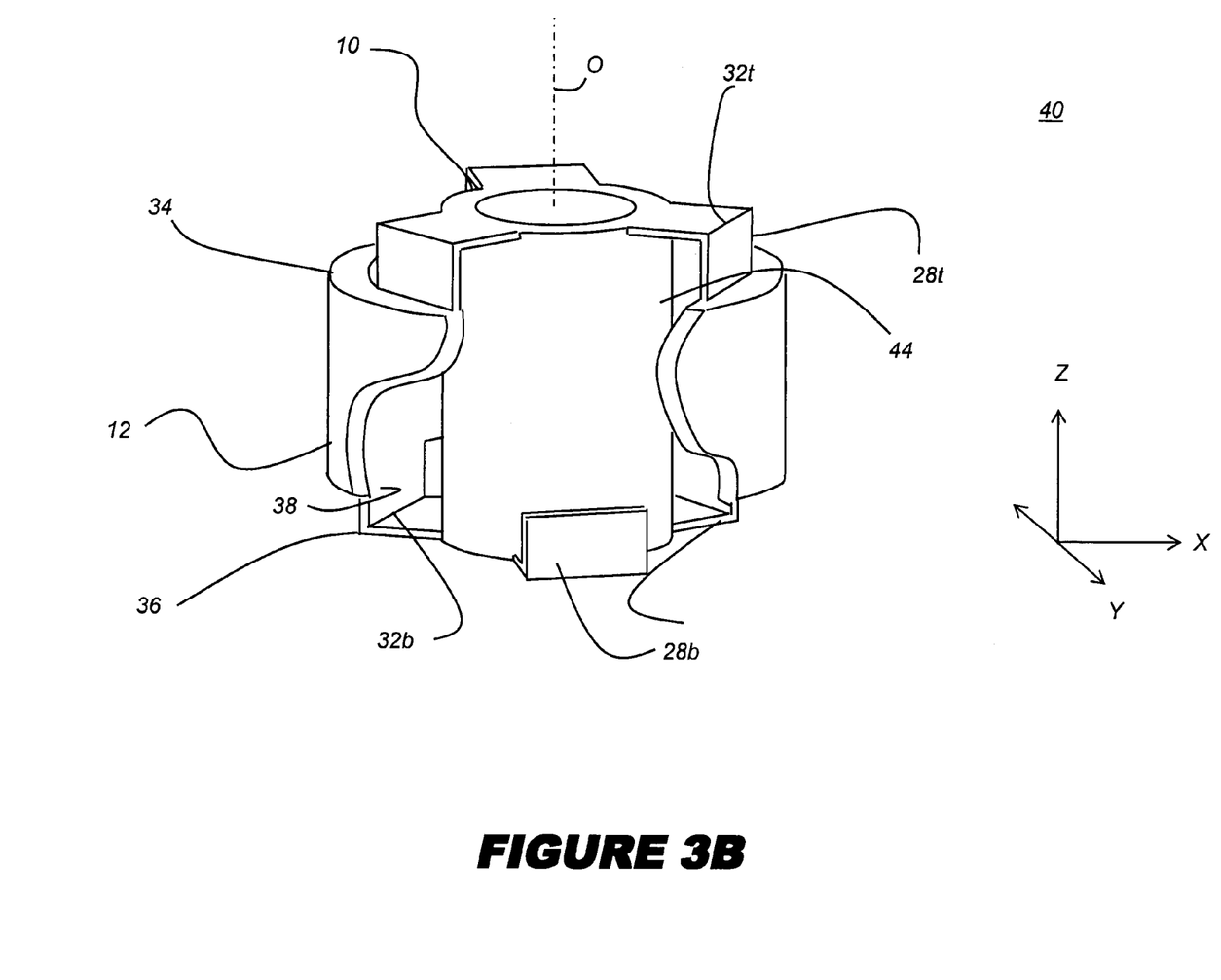
FIG. 3B is a partial sectioned view of the optical mount shown in FIG. 3A.
Figure 3C:
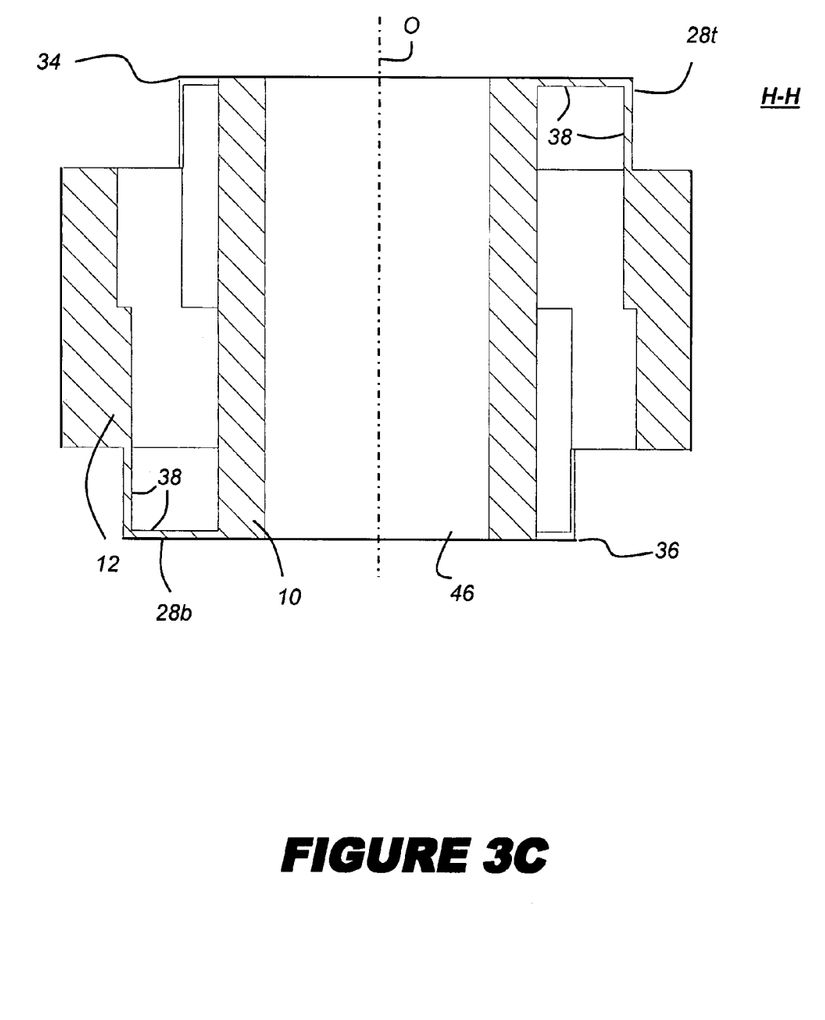
FIG. 3C is a cross section view of the optical mount shown in FIG. 3A.
Figure 3D:
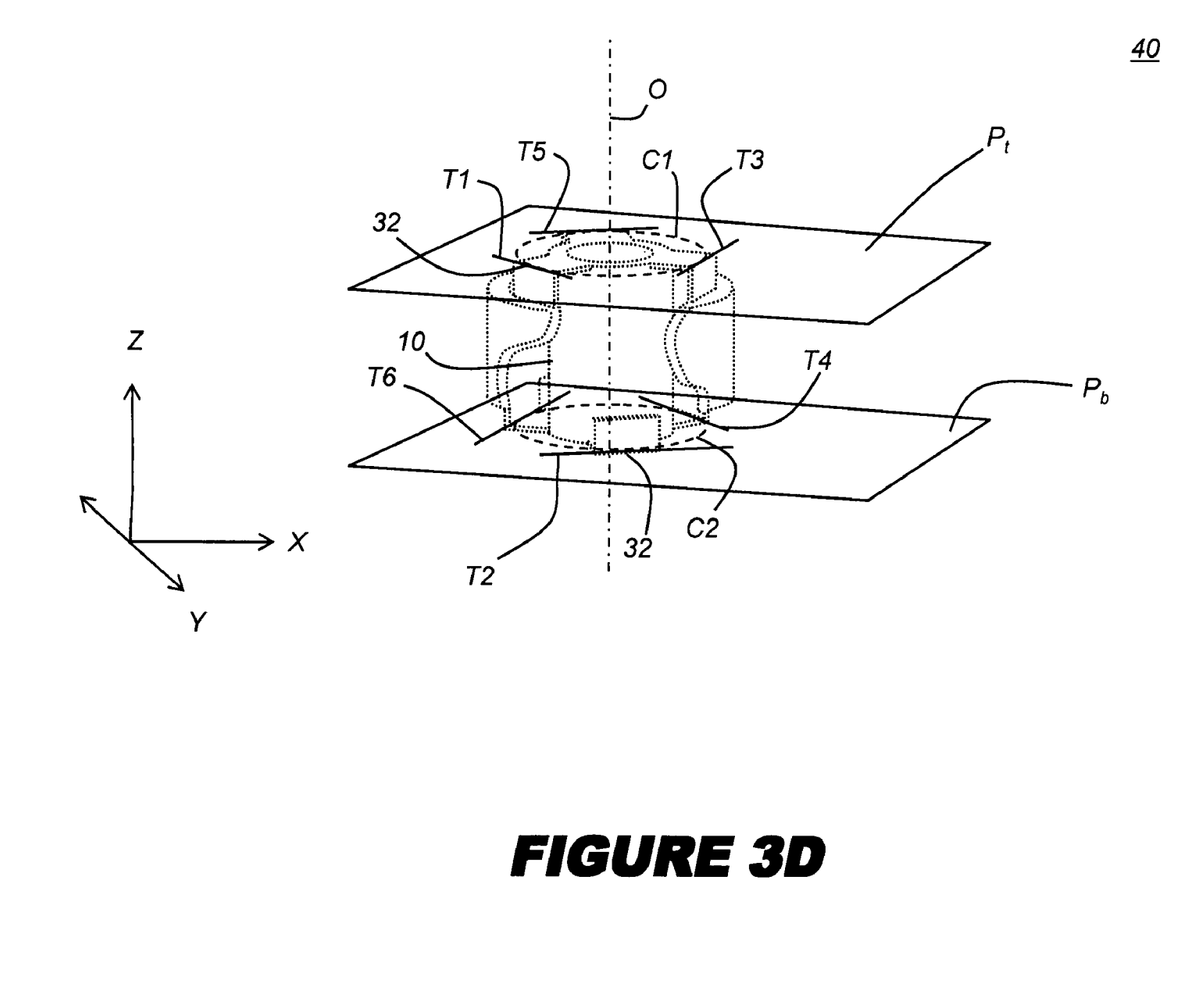
FIG. 3D is a perspective view showing tangent lines formed in parallel planes by folds of the two respective sets of fold flexures.
Figure 3E:
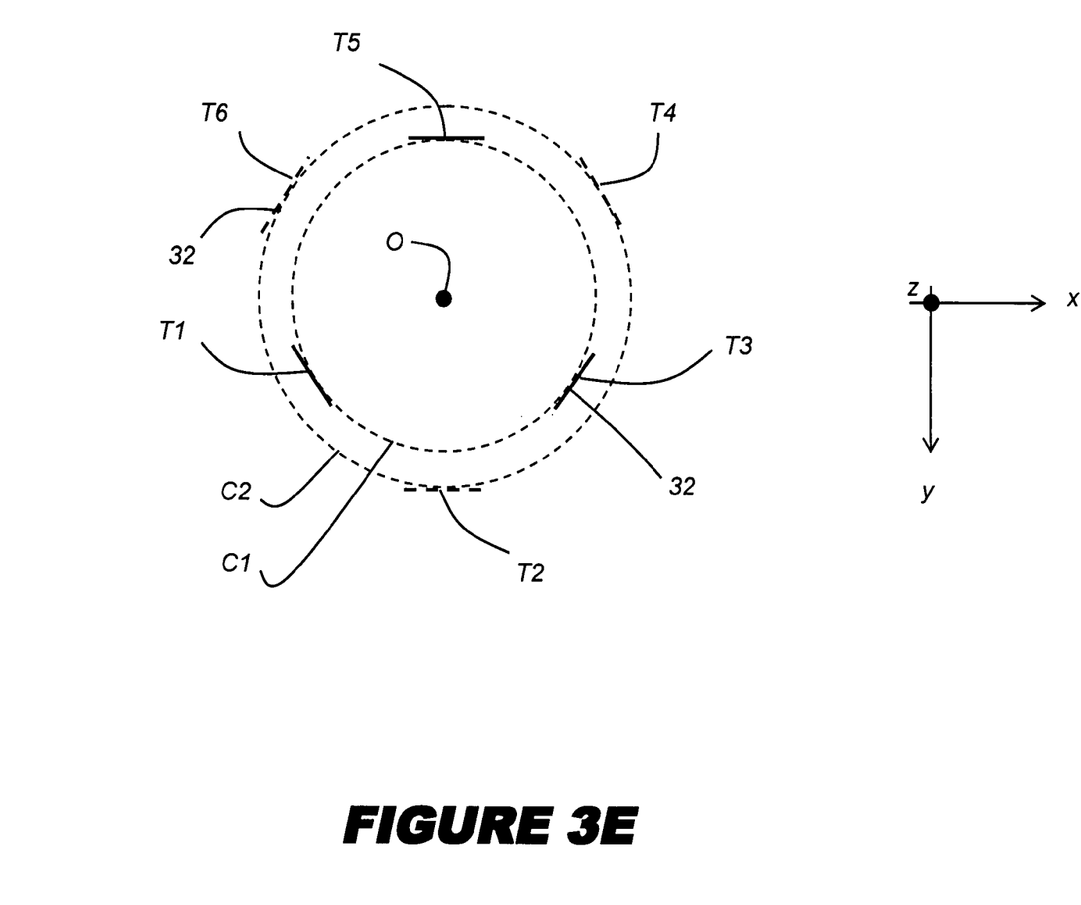
FIG. 3E is a view of the tangent lines of FIG. 3D taken along the axis.

The perspective view of FIG. 3D and top view of FIG. 3E show the geometric arrangement that applies for optical element mount 40 embodiments of the present invention. Optical element mount 40 has two sets of fold flexures: a first set in which each fold 32 lies on a tangent T1, T3, T5 to a first circle C1 lying in a first plane, top plane $P_t$ in FIG. 3D, that is orthogonal to the axis O; and a second set in which each fold 32 lies on a tangent T2, T4, T6 to a second circle C2 lying in a second plane, bottom plane $P_b$ in FIG. 3D, that is parallel to the first plane. FIG. 3E shows a view taken along the axis O. As shown, the folds for the first set, corresponding to tangents T1, T3, T5 do not align with the folds for the second set, corresponding to tangents T2, T4, T6. For clarity of illustration, FIG. 3E shows an embodiment in which circles C1 and C2 that define the two sets of tangents have different diameters; however, circles C1 and C2 may have the same diameter.

Using the FIG. 3A-3E configuration, the inner surfaces 38 of the top set of fold flexures 28t can be formed by erosion of material working inward from bottom surface 36. Similarly, the inner surfaces 38 of the bottom set of fold flexures 28b can be formed by erosion of material working inward from top surface 34.

Figure 4:
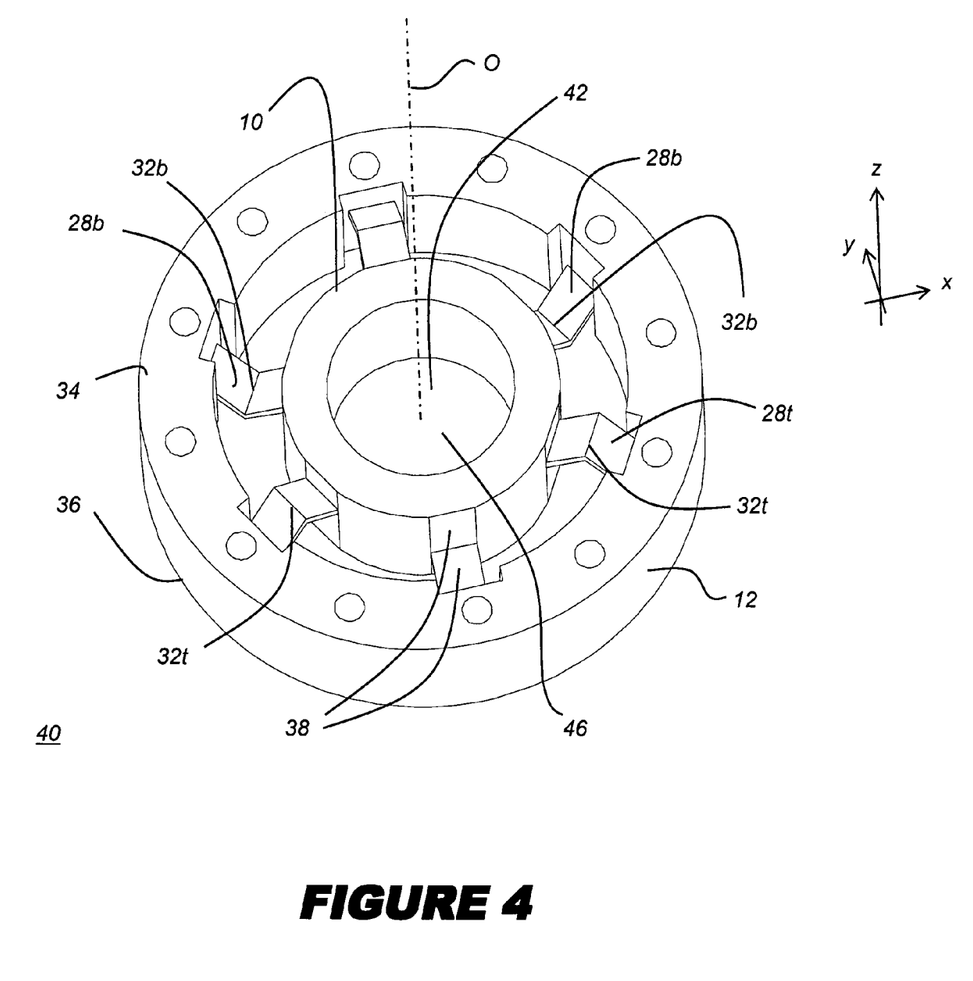
FIG. 4 is a perspective view of the monolithic optical mount in an alternate embodiment.

In the embodiments of FIGS. 2A and 3A, fold flexures 28t, and 28b are shown having generally right-angle inner folds 32, 32t, and 32b. However, other fold arrangements could be used. The perspective view of FIG. 4 shows components of optical element mount 40 in an alternate embodiment in which fold flexures 28b and 28t are generally V-shaped with the V shape formed by the inner surfaces of bottom fold flexures 28b facing upward, toward top surface 34 and the V-shape of top fold flexures 28t inverted or facing downward toward bottom surface 36. It should be observed that this follows the same basic pattern shown in the embodiment of FIG. 3A-3C, in which top fold flexures 28t and bottom fold flexures 28b have inner surfaces 38 that face or "open" in opposite directions. Having folds that face in opposite directions is optional, but may be beneficial for machining, particularly where cavity 44 that lies between lens holder 10 and frame 12 is narrow.

Figure 5:
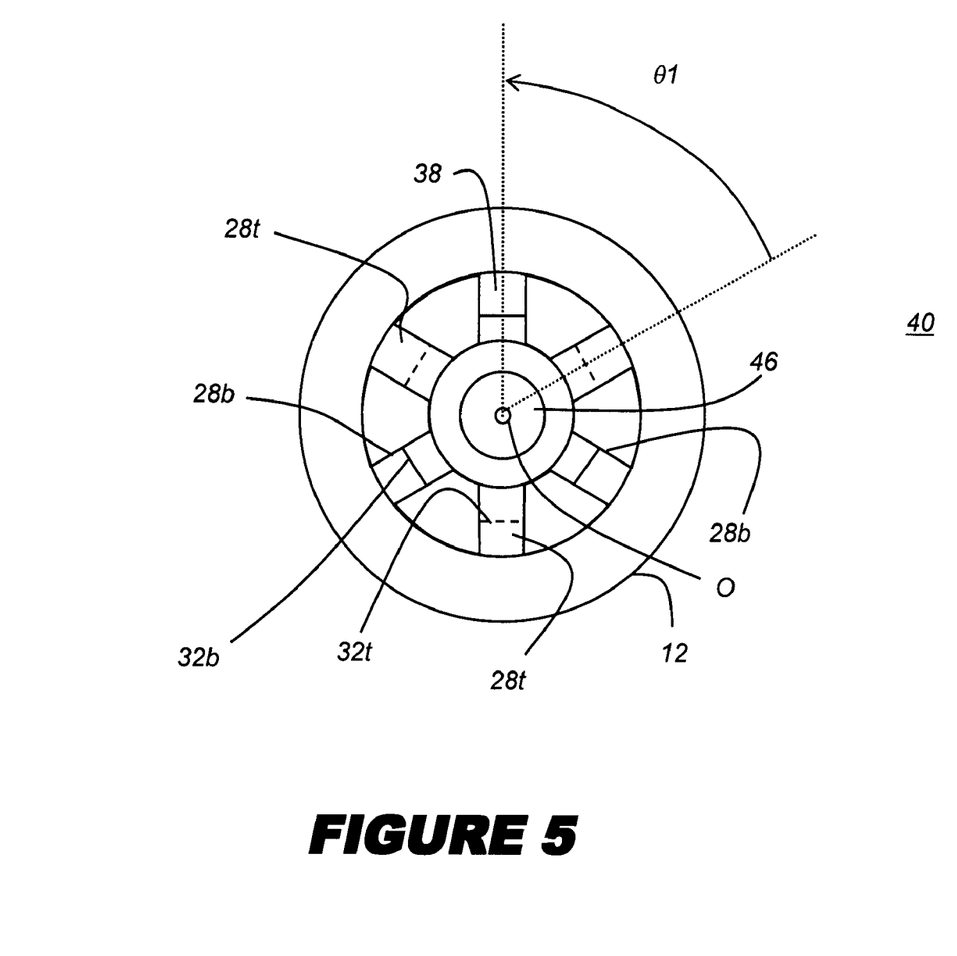
FIG. 5 is a top view of the monolithic optical mount of FIG. 4.

FIG. 5 shows, for embodiments such as that shown in FIGS. 3A-3C and 4, a top view of optical element mount 40 having a centered orifice or opening 46 and shows how top fold flexures 28t and bottom fold flexures 28b are arranged, extending radially about axis O in alternating sequence, but not radially aligned. That is, the same basic relationship shown in FIGS. 3D and 3E also applies to the embodiment of FIGS. 4 and 5. The fold flexures are in two sets: those opening or facing upwards (fold flexures 28b) and those opening downwards (fold flexures 28t). For each set, the folds lie on tangents to respective circles in parallel planes and, with respect to a view taken along the axis, folds of one set do not align with folds of the other, in the same manner as described earlier with reference to FIG. 3E. In an alternate embodiment, folds in the top and bottom sets may all face in the same direction.

In the specific embodiment of FIG. 5, with respect to this view taken along optical axis O, each fold flexure 28t or 28b extends from axis O at a unique angle, spaced radially at an angle $+/-\theta_1$ with respect to its adjacent fold flexures. Angle $\theta_1$ between each of the fold flexures 28t or 28b should be equal; motion impurity can result if this angle is not equal. Adjacent fold flexures 28t and 28b have folds 32t and 32b that are not parallel to each other, but lie in respectively parallel planes as noted earlier with respect to FIG. 3D. Folds 32t and 32b of the top and bottom sets of fold flexures can also be said to be mutually non-overlapping. In the top view of FIG. 5, top fold flexures 28t have folds 32t indicated by dashed lines; bottom fold flexures 28b have folds 32b indicated by solid lines.

Monolithic Fabrication

Advantageously, the combination of this movable inner element and its reference, stationary frame can be constituted monolithically, that is, formed from a single block of material. Single-part or monolithic construction has advantages for eliminating problems such as those caused by thermal coefficient differences and fastener fabrication and assembly. Overall, a single-part machined lens mount assembly would inherently have reduced mechanical stress over other types of lens mounts. A single part allows simpler handling, assembly, and mounting for constructing an optical assembly. A monolithically formed optical mount has built-in alignment. Forming an optical element mount from a single block of material by fabricating an inner member suspended within an outer member has configuration advantages and allows flexible design. The outer member can be suitably dimensioned for mounting in an optical assembly while the inner member can be appropriately designed for holding an optical component in position along the optical axis.

As noted earlier, the optical element mount of the present invention can be fabricated subtractively by forming an arrangement of cavities in a single block of material. It can be observed that the rearrangement of fold flexures shown in FIGS. 3A-3C and 4 provides a similar network of constraints to those used in the embodiment of FIG. 2A, summarized using the planar relationship shown in FIG. 1D. Again, the set of top inner folds 32t lie in one plane $P_t$ and the set of bottom inner folds 32b lie in another plane $P_b$, with planes $P_t$ and $P_b$ in parallel. However, since fold flexures 28t and 28b are not radially aligned in FIG. 3A and FIG. 4 embodiments, as they are in FIG. 2A, the FIG. 3A and FIG. 4 embodiments can be machined in a more straightforward manner, using only plunge cuts, for example. These plunge cuts, made from both top and bottom surfaces 34 and 36 of optical element mount 40, could be parallel to axis O (the z-axis) and of varying depths. This arrangement may also permit other types of erosive machining operations that would not be well-suited for the radially aligned embodiment of FIG. 2A, such as laser machining, for example.

Using machining techniques made possible by Computerized Numerical Control (CNC), highly accurate and repeatable machining can be performed to provide single-part construction. EDM machining (Electrical Discharge Machining) is one specialized form of CNC machining that can be used for precision fabrication of complex parts from metal and other hard, conductive materials. Briefly, EDM selectively erodes material from a workpiece of a conductive substance using an electrical discharge across the gap between an electrode and the material to be removed. A dielectric fluid continually flows in the gap area around the electrode and flushes out the removed material. Wire EDM is one form of EDM, using a continuously moving wire as its electrode. Other techniques that may be suitable for fabricating a monolithic component can include conventional machining, laser machining, various etching techniques, water jets, and machining technologies in general that remove material from a solid block, forming and shaping cavities of defined dimensions, controlling their overall contour and depth.

The material used for monolithic optical element mount 40 can be any suitable material for the type of application and fabrication method that is used, including stainless steel, aluminum, or some other metal or any of a number of types of polymers such as plastics, ceramics, or other materials that allow the necessary degree of flexure. For EDM use, a conductive material is required. Orifice or opening 26 can be formed initially within the block of material, using lower-cost machining methods, for example.

With some materials, optical element mount 40 can be a molded part or can be formed by additive methods, including material deposition, for example. Any of a number of rapid prototyping techniques could be used to provide a monolithic structure. Some examples of rapid-prototyping technologies that could be employed for fabrication of optical element mount 40 include Selective Laser Sintering (SLC), stereolithography, and a host of other techniques that fabricate solid structures in an additive fashion. These techniques deposit a single material in a pattern that forms the inner member of lens holder 10 within the outer member of frame 12 and form top and bottom sets of fold flexures 28t and 28b extended between them.

Optical element mount 40 may also have advantages for providing its arrangement of constraints in applications other than photolithography. Because it can be formed as a monolithic structure, the kinematic mount mechanism of the present invention can be precision-fabricated, eliminating a significant amount of assembly and adjustment needed with conventional lens mounting devices and also minimizing unwanted thermal effects. An actuator, lever, or other mechanism can be used to apply a force to lens holder 10 and provide pure axial motion, without introducing unwanted translation along any axis orthogonal to the optical axis or rotation about such an orthogonal axis.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while the apparatus of the present invention is well-suited to photolithography applications, this mount can be used in any of a number of other applications for which only z-axis motion is permissible. Optical element 42 in opening 46 of lens holder 10 is a spherical lens in one embodiment. However, this can be any suitable type of refractive, reflective, prismatic, film, or other optical component. As another option, the inner member described herein as lens holder 10 could serve as the optical element itself, by being treated with a reflective coating, for example. Lens holder 10 and frame 12 can have any suitable shape, with lens holder 10 usually symmetric about optical axis O. However, symmetry about this axis is not required.

It should be noted that the mathematical definition of a cylinder includes not only the familiar right circular cylinder, but also any number of other shapes whose outer surface can be defined by moving a straight line parallel to a fixed straight line, wherein the moving straight line intersects a fixed planar closed curve or base. Although cylindrical shapes are shown for lens holder 10 and frame 12 in the exemplary embodiments of FIG. 2A and following, either or both of these components could be non-cylindrical in shape.

Fold flexures 28t and 28b can have any of a number of arrangements, such as the right-angle and V-shapes described earlier, provided that their folds lie in parallel planes as noted with reference to FIGS. 1D and 3D. While embodiments shown use a set of three top fold flexures 28t and a set of three bottom fold flexures 28b, other arrangements of these two sets of fold flexures could be used, with two or more fold flexures in each set. Overconstraint concerns are minimized due to the monolithic construction.

Thus, what is provided is a monolithically constituted mount for an optical element that allows movement along an optical axis, but constrains translational movement in directions orthogonal to the optical axis and rotational movement along any axis.

The invention claimed is:

1. A monolithic optical element mount comprising:
   an inner member suspended within an outer member and movable with respect to the outer member along an axis;
   a first set of fold flexures extending from the inner member to the outer member, wherein each fold flexure in the first set has a fold that lies in a first plane that is orthogonal to the axis;
   a second set of fold flexures extending from the inner member to the outer member, wherein each fold flexure in the second set has a fold that lies in a second plane that is parallel to the first plane;
   and wherein, with respect to a view taken along the axis, the folds for the first set do not align with the folds for the second set.

2. The monolithic optical element mount of claim 1 wherein the outer member is substantially cylindrical.

3. The monolithic optical element mount of claim 1 wherein the inner member is substantially cylindrical.

4. The monolithic optical element mount of claim 1 wherein the inner member has an opening.

5. The monolithic optical element mount of claim 1 wherein the inner member holds an optical element taken from the group consisting of a refractive element, a reflective element, a prism, and a film.

6. The monolithic optical element mount of claim 1 wherein the inner member is symmetric about the axis.

7. The monolithic optical element mount of claim 1 formed from an electrically conductive material.

8. The monolithic optical element mount of claim 7 wherein the material is taken from the group consisting of stainless steel and aluminum.

9. A monolithic optical element mount comprising:
   a) a block of material having top and bottom surfaces;
   b) an inner member formed within the block and movable with respect to an outer member along an axis,
   wherein the inner member is defined by a channel formed within the block, and wherein the inner member is suspended by both a top set of fold flexures and a bottom set of fold flexures formed in the block and extending from the inner member to the outer member;
   wherein the folds of the top set of fold flexures lie in a first plane, orthogonal to the axis,
   wherein the folds of the bottom set of fold flexures lie in a second plane, parallel to the first plane,
   and wherein, with respect to a view taken along the axis, folds of the top and bottom sets of fold flexures are mutually non-overlapping.

10. The optical element mount of claim 9 wherein the inner folds of the top set of fold flexures face toward a first direction and the inner folds of the bottom set of fold flexures face toward the opposite direction.

11. The optical element mount of claim 9 wherein the block of material is an electrically conductive material.

12. The monolithic optical element mount of claim 9 wherein the outer member is substantially cylindrical.

13. The monolithic optical element mount of claim 9 wherein the inner member is substantially cylindrical.

14. The monolithic optical element mount of claim 9 wherein the inner member has an opening.

15. The monolithic optical element mount of claim 9 wherein the inner member holds an optical element taken from the group consisting of a refractive element, a reflective element, a prism, and a film.

16. The monolithic optical element mount of claim 9 wherein the inner member is symmetric about the axis.

17. A method for forming an optical element mount from a single block of material comprising:
   forming a cavity that defines an inner member that is suspended within an outer member along an axis by a top set of fold flexures and a bottom set of fold flexures,
   removing material erosively inward from the bottom surface of the block to form the inner surfaces of the top set of fold flexures wherein each fold flexure in the top set has a fold that lies in a first plane that is orthogonal to the axis, and
   removing material erosively inward from the top surface of the block to form the inner surfaces of the bottom set of fold flexures wherein each fold flexure in the bottom set has a fold that lies in a second plane that is parallel to the first plane.

18. The method of claim 17 wherein forming a cavity comprises using electrical discharge machining.

19. A method for forming a monolithic optical element mount comprising:
   depositing a first pattern of a material to form an outer member;
   depositing a second pattern of the material to form an inner member within the outer member, wherein the inner member is defined about an axis;
   forming a top set of fold flexures of the material, the top set of fold flexures extending from the inner member to the outer member, wherein the folds of the top set of fold flexures lie in a first plane that is orthogonal to the axis;
   forming a bottom set of fold flexures of the material, the bottom set of fold flexures extending from the inner member to the outer member, wherein the folds of the bottom set of fold flexures lie in a second plane that is parallel to the first plane,
   wherein, with respect to a view taken along the axis, folds of the top and bottom sets of fold flexures are mutually non-overlapping.

20. The method of claim 19 wherein the second pattern comprises an opening about the axis.

* * * * *